United States Patent
Warner et al.

(10) Patent No.: US 6,410,110 B1
(45) Date of Patent: *Jun. 25, 2002

(54) PIPE MADE FROM METATHESIS POLYMERIZED OLEFINS

(75) Inventors: Mark W. Warner, Benton; Steven D. Drake, Sherwood; Larry L. Cagle, Little Rock, all of AR (US); Charles S. Woodson, Conroe, TX (US)

(73) Assignees: A.O. Smith Corp., Milwaukie, WI (US); Cymetech, LLC, Hunstville, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/148,834

(22) Filed: Sep. 4, 1998

Related U.S. Application Data

(60) Provisional application No. 60/058,091, filed on Sep. 5, 1997, and provisional application No. 60/057,959, filed on Sep. 5, 1997.

(51) Int. Cl.$^7$ .............................. B29C 41/04; F16L 9/27
(52) U.S. Cl. .................. 428/36.9; 138/118; 156/166; 156/171; 156/181; 156/244.4; 428/36.92
(58) Field of Search .................... 428/36.9, 36.92; 156/166, 171, 181, 244.4; 138/118

(56) References Cited

U.S. PATENT DOCUMENTS

| | | | |
|---|---|---|---|
| 4,246,367 A | | 1/1981 | Curtis, Jr. .................. 525/49 |
| 4,301,306 A | | 11/1981 | Layer .......................... 568/734 |
| 4,324,717 A | | 4/1982 | Layer .......................... 524/244 |
| 4,380,617 A | | 4/1983 | Minchak et al. ............. 526/161 |
| 4,661,575 A | | 4/1987 | Tom ............................ 526/283 |
| 4,708,969 A | | 11/1987 | Leach .......................... 521/82 |
| 4,748,216 A | | 5/1988 | Tom ............................ 526/77 |
| 4,902,560 A | * | 2/1990 | Silver .......................... 428/273 |
| 4,907,527 A | * | 3/1990 | Hilakos et al. ................ 118/67 |
| 4,943,621 A | | 7/1990 | Janda et al. .................. 526/127 |
| 5,063,103 A | | 11/1991 | Sugawara et al. ........... 428/285 |
| 5,261,462 A | * | 11/1993 | Wolfe et al. .................. 138/130 |
| 5,266,370 A | * | 11/1993 | Woodson et al. ......... 428/36.92 |
| 5,294,461 A | * | 3/1994 | Ishida et al. ................. 427/293 |
| 5,296,566 A | | 3/1994 | Brown-Wensley et al. . 526/171 |
| 5,312,940 A | | 5/1994 | Grubbs et al. ............... 556/136 |
| 5,342,909 A | * | 8/1994 | Grubbs et al. ............... 526/171 |
| 5,369,195 A | | 11/1994 | Kelsey ......................... 526/119 |
| 5,378,783 A | | 1/1995 | Okumura et al. ............ 526/283 |
| 5,480,940 A | | 1/1996 | Khasat et al. ................ 525/290 |
| 5,539,060 A | | 7/1996 | Tsunogae et al. ............ 525/338 |
| 6,040,363 A | * | 3/2000 | Warner et al. ............... 523/214 |
| 6,071,459 A | * | 6/2000 | Warner et al. ............... 264/311 |

FOREIGN PATENT DOCUMENTS

| | | | | |
|---|---|---|---|---|
| WO | WO 97/20865 | * | 6/1997 | ............. C08F/4/80 |

OTHER PUBLICATIONS

Nguyen, et al., "Ring–Opening Metathesis Polymerization (ROMP) of Norbornene by a Group VIII Carbene Complex in Protic Media", J. Am. Chem. Soc., 114, P. 3974–3975, 1992.

Goodrich, "Non–Reinforced Plastic Combines Strength with Chemical Resistance", Chemical Engineering, p. 153, Jul. 1996.

Novak, et al., "Catalytic Organometallic Chemistry in Water: The Aqueous Ring–Opening Metathesis Polymerization of 7–Oxanorbornene Derivatives", J. Am. Chem. Soc., 110, p. 7542–7543, 1988.

Novak, et al., "The Ring Opening Metathesis Polymerization of 7–Oxabicyclo[2.2.1]hept–5–ene Derivatives: A New Acyclic Polymeric Ionophore", J. am. Chem. Soc., 110, p. 960–961, 1988.

Novak and Grubbs, J.Am. Chem. Soc. v. 110, pp 7542–7543, 1988.*

* cited by examiner

*Primary Examiner*—Harold Pyon
*Assistant Examiner*—Sandra M. Nolan
(74) *Attorney, Agent, or Firm*—Pillsbury Winthrop LLP

(57) ABSTRACT

Thermosetting resin pipes and pipe fittings are provided which are prepared by polymerizing a cyclic olefin monomer in the presence of a ruthenium or osmium metathesis polymerization catalyst. These articles may be prepared by various methods, such as centrifugal casting. Reinforced articles may also be prepared by filament winding.

3 Claims, No Drawings

PIPE MADE FROM METATHESIS POLYMERIZED OLEFINS

RELATED APPLICATION

This application claims the benefit under 35 U.S.C. Section 119 of now abandoned U.S. Provisional Patent Applications Ser. No. 60/058,091 filed Sep. 5, 1997 and Serial No. 60/057,959 filed Sep. 5, 1997.

FIELD OF THE INVENTION

The present invention relates to thermosetting resin pipe and pipe fittings made of metathesis polymerized olefins, and methods for producing the same. More particularly, the invention relates to thermosetting resin pipe and pipe fittings made of polycycloolefins wherein the cycloolefins are polymerized through Ring Opening Metathesis Polymerization (ROMP) reactions.

BACKGROUND PRIOR ART

Many polymers of olefins produced through metathesis polymerization reactions, especially polymers of cycloolefins produced through ROMP reactions, are tough and rigid, and have good chemical resistance. It is desirable to produce pipe and pipe fittings out of such material for use in many applications.

Generally, one method of producing articles out of thermosetting resins is to create a reaction mixture by mixing a liquid monomer and a polymerization catalyst. The mixture is then processed or worked through an appropriate polymer processing technique to shape the desired article, and the polymerization reaction proceeds (the article "cures") to form the desired polymer article. The time during which the liquid monomer/catalyst mixture can be worked or processed after the monomer and catalyst are mixed is called the "pot life" of the polymerization reaction.

Several significant problems have existed regarding the production of pipe out of metathesis polymerized olefins using such techniques. For the most part, these problems are due to the metathesis catalyst systems that are used.

The original catalyst systems used for metathesis reactions were of the Ziegler type. A variety of other systems have alpo been developed based on tungsten and molybdenum. All of these catalyst systems have significant drawbacks for use in making thermosetting resin pipe.

With these catalyst systems, the polymerization reaction has a very short pot life, and there are no good methods for controlling the rate of polymerization once the reaction mixture is formed. Due to the short pot life of these metathesis reactions, many traditional methods for making thermosetting resin pipe and pipe fittings are generally not feasible, because to successfully produce pipe, the reaction mixture must not gel before the pipe is completely formed. In many methods of production, the short pot life adds significant complexity to the methods and requires the use of special procedures to produce pipe or pipe fittings. For example, in rotational and centrifugal casting methods, pressure is typically required in the casting environment to ensure that gas bubbles that form using the old catalysts are removed from within the monomer prior to the gelling of the monomer due to the rapid polymerization. Additionally, the monomer must immediately be moved to the casting position within the casting mold such that the monomer is in the correct pipe casting position prior to the gelling of the monomer.

Furthermore, uncontrolled cross-linking takes place during these rapid metathesis polymerization reactions, therefor not allowing for maximum chain growth and molecular weight of the polymer. Therefore, polymers with less desirable properties are produced with these catalyst systems. This uncontrolled cross-linking also does not allow for the easy production of random and block copolymers or terpolymers having unique properties.

Additionally, these metathesis catalyst systems are all easily poisoned by impurities, air, moisture, and by many pigments, fillers, and additives. Therefore, the production of pipe and pipe fittings using these catalysts must occur under very controlled conditions and with exceptionally high purity grades of monomer. Methods such as filament winding, pultrusion, centrifugal casting and rotational molding are very difficult to perform in the inert environment needed for the traditional catalysts. This greatly increases the cost of producing reinforced and unreinforced thermosetting resin pipe and pipe fittings made of metathesis polymerized olefins.

Due to these drawbacks and difficulties, pipe made of metathesis polymerized olefins has been very difficult to produce. Even when it has been possible to produce such pipe, the production costs are quite expensive, and often economically unfeasible. As a result, such pipes and pipe fittings, which have excellent chemical resistance and improved physical properties, have not been widely available.

It is desirable to provide for reinforced and unreinforced thermosetting resin pipe made of metathesis polymerized olefins, especially a ROMP reaction polymerized cycloolefin polymer, and a method for producing the same, wherein these drawbacks and difficulties can be substantially avoided.

SUMMARY OF THE INVENTION

The present invention addresses these needs by providing for pipes and pipe fittings made of metathesis polymerized olefins, and a method for making the same, using a ruthenium or osmium carbene complex catalyst to polymerize the olefin. In the current invention, many of the drawbacks and difficulties discussed above are minimized or avoided.

The use of the ruthenium or osmium carbene complex catalyst allows the metathesis reaction to be slowed down and more easily controlled, thereby providing for longer pot lives as desired for pipe production. As a result, methods such as rotational molding and centrifugal casting can be used without the need to pressurize the casting tube, or perform other operations necessary to counteract the short pot life of the old catalysts.

The use of a ruthenium or osmium catalysts also provides for increased chain growth and molecular weight prior to cross-linking, thereby providing for polymers with better properties. Also, the use of these catalysts provides controlled cross-linking, and the easy production of random and block copolymers, and random and block terpolymers, thereby allowing for the production of pipes made of metathesis polymerized polyolefins having unique and better physical characteristics than previously produced. For example, pipe and pipe fittings with better ductility and impact resistance can be produced through these methods.

Additionally, the ruthenium and osmium catalysts are not easily poisoned by impurities, air, moisture, and by many pigments, fillers, and additives.

Therefore, the production of pipe and pipe fittings from metathesis polymerized polyolefins is simplified using this method.

Other features and advantages of the invention will become apparent to those skilled in the art upon review of the following detailed description and claims.

Before embodiments of the invention are explained in detail, it is to be understood that the invention is not limited in its application to the details of the composition and concentration of components set forth in the following description. The invention is capable of other embodiments and of being practiced or being carried out in various ways. Also, it is understood that the phraseology and terminology used herein is for the purpose of description and should not be regarded as limiting.

DETAILED DESCRIPTION OF AN EMBODIMENT

The invention provides thermosetting resin pipe and pipe fittings made from metathesis polymerized olefins, and methods for producing the same. The olefin metathesis reactions are catalyzed by ruthenium or osmium carbene complex catalysts to produce polyolefin pipe and pipe fittings. The pot life of the olefin polymerization reaction can be extended using the ruthenium or osmium carbene metathesis catalysts and known methods for extending the pot lives of reactions using these catalysts. The extended pot life allows pipe and pipe fittings to be made through processes that were unavailable or difficult to use prior to the current invention. Additionally, the ruthenium or osmium carbene metathesis catalysts are more tolerant of impurities than traditional metathesis catalysts, and therefore the presence of additives, bonding agents, impurities, and some low grade monomers do not substantially adversely affect the catalysts.

In accordance with this invention, an olefin monomer is polymerized through metathesis catalysis with a ruthenium or osmium carbene metathesis catalyst, and the monomer is polymerized while using a polymer processing technique to form thermosetting olefin resin pipe.

Suitable ruthenium and osmium carbene catalysts, the methods of synthesizing such catalysts, and suitable olefin monomers as well as the methods for performing and controlling the polymerization reaction, are disclosed in the following patents and patent application, all of which are incorporated herein by reference: U.S. Pat. Nos. 5,312,940 and 5,342,909 and WO 97/20865.

Catalysts

Generally suitable catalysts are ruthenium and osmium carbene complex catalysts disclosed in the above cited references.

The preferred ruthenium and osmium carbene complex catalysts include those which are stable in the presence of a variety of functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxo, anhydride, carbamate, and halogen. When the catalysts are stable in the presence of these groups, the starting monomers, impurities in the monomer, the coupling agents, any substituent groups on the catalyst, and other additives may include one or more of the above listed groups without deactivating the catalysts.

The catalyst preferably includes a ruthenium or osmium metal center that is in a +2 oxidation state, has an electron count of 16, and is pentacoordinated. These ruthenium or osmium carbene complex catalysts may be represented by the formula:

where:

M is Os or Ru;

R and $R^1$ may be the same or different and may be hydrogen or a substituent group which may be $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. Optionally, the substituent group may be substituted with one or more groups selected from $C_1$–$C_5$ alkyl, halide, $C_1$–$C_5$ alkoxy, and phenyl. The phenyl group may optionally be substituted with one or more groups selected from halide, $C_1$–$C_5$ alkyl, and $C_1$–$C_5$ alkoxy. Optionally, the substituent group may be substituted with one or more functional groups selected from hydroxyl, thiol, thioether, ketone, aldehyde, ester, ether, amine, imine, amide, nitro, carboxylic acid, disulfide, carbonate, isocyanate, carbodiimide, carboalkoxy, peroxo, anhydride, carbamate, and halogen. In a preferred embodiment, R and $R^1$ are the same or different and may be hydrogen, substituted aryl, unsubstituted aryl, substituted vinyl, and unsubstituted vinyl; where the substituted aryl and substituted vinyl are each substituted with one or more groups selected from hydroxyl, thiol, thioether, ketone, aldehyde, ester, ether, amine, imine, amide, nitro, carboxylic acid, disulfide, carbonate, isocyanate, carbodiimide, carboalkoxy, peroxo, anhydride, carbamate, and halogen, $C_1$–$C_5$ alkyl, $C_1$–$C_5$ alkoxy, unsubstituted phenyl, and phenyl substituted with halide, $C_1$–$C_5$ alkyl or $C_1$–$C_5$ alkoxy, X and $X^1$ may be the same or different and may generally be hydrogen or any anionic ligand. Generally, an anionic ligand is any ligand which when removed from a metal center in its closed shell electron configuration has a negative charge. In a preferred embodiment, X and $X^1$ are the same or different and may be halogen, hydrogen or a substituent group selected from $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, aryl or $C_1$–$C_{20}$ alkylsulfonate, $C_1$–$C_{20}$ alkylthio, $C_1$–$C_{20}$ alkylsulfonyl, and $C_1$–$C_{20}$ alkylsulfinyl. The substituent groups may optionally be substituted with $C_1$–$C_5$ alkyl, halogen, $C_1$–$C_5$ akloxy or phenyl. The phenyl may be optionally substituted with halogen, $C_1$–$C_5$ alkyl, or $C_1$–$C_5$ alkoxy. In a more preferred embodiment, X and $X^1$ are the same or different and may be Cl, Br, I, H or a substituent group selected from benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate. The substituent groups may be optionally substituted with $C_1$–$C_5$ alkyl or a phenyl group. The phenyl group may optionally be substituted with halogen, $C_1$–$C_5$ alkyl or $C_1$–$C_5$ alkoxy. In an even more preferred embodiment, X and $X^1$ are the same or different and are selected from Cl, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate. In the most preferred embodiment, X and $X^1$ are both Cl; and L and $L^1$ may be the same or different and may generally be any neutral electron donor.

Generally, a neutral electron donor is any ligand which, when removed from a metal center in its closed shell electron configuration, has a neutral charge. In a preferred embodiment, L and $L^1$ may be the same or different and may be phosphines, sulfonated phosphines, phosphites, phosphinites, phosphonites, arsines, stibines, ethers, amines, amides, sulfoxides, carboxyls, nitrosyls, pyridines, and thioethers. In a more preferred embodiment, L and $L^1$ are the same or different and are phosphines of the formula $PR^3R^4R^5$ where $R^3$ is a secondary alkyl or cycloaklyl and $R^4$ and $R^5$ are the same or different and are aryl, $C_1$–$C_{10}$ primary alkyl, secondary alkyl, or cycloaklyl. In the most preferred embodiment, L and $L^1$ are the same or different and are —P(cyclohexyl)$_3$, —P(cyclopentyl)$_3$, or —P(isopropyl)$_3$. L and $L^1$ may also be —P(phenyl)$_3$.

A preferred group of catalysts are those where M is Ru; $R^1$ and R are independently hydrogen or substituted or unsubstituted aryl or substituted or unsubstituted vinyl; X and $X^1$ are Cl; and L and $L^1$ are triphenylphosphines or trialkylphosphines such as tricyclopentylphosphine, tricyclohexylphosphine, and triisopropylphosphine. The substituted aryl and substituted vinyl may each be substituted with one or more groups including $C_1$–$C_5$ alkyl, halide, $C_1$–$C_5$ alkoxy, and a phenyl group which may be optionally substituted with one or more halide, $C_1$–$C_5$ alkyl, or $C_1$–$C_5$ alkoxy groups. The substituted aryl and substituted vinyl may also be substituted with one or more functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxo, anhydride, carbamate, and halogen.

Particularly preferred catalysts can be represented by the formulas:

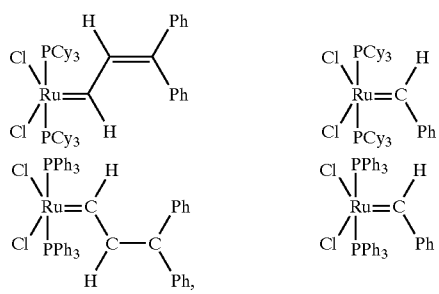

where Cy is cyclopentyl or cyclohexyl, and Ph is phenyl.

The most preferred catalysts can be represented by the formula:

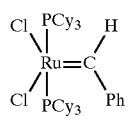

where Cy is cyclopentyl or cyclohexyl, and Ph is phenyl.

The catalysts described above are useful in polymerization of a wide variety of olefin monomers through metathesis polymerization, particularly ROMP of cycloolefins.

Monomers

Suitable monomers include olefins that can be polymerized by any of the ruthenium or osmium metathesis polymerization catalysts that were discussed above.

The olefin monomers may be unfunctionalized or functionalized to contain one or more functional groups selected from the group consisting of hydroxyl, thiol, thioether, ketone, aldehyde, ester, ether, amine, imine, amide, pitro, carboxylic acid, disulfide, carbonate, isocyanate, carbodiimide, carboalkoxy, peroxy, anhydride, carbamate, and halogen. The olefin may be a strained cyclic olefin, or unstrained cyclic olefin; each of which may be functionalized or unfunctionalized.

Preferred monomers include functionalized or unfunctionalized cyclic olefins that are polymerized through ROMP reactions. This polymerization process includes contacting a functionalized or unfunctionalized cyclic olefin with a ruthenium or osmium metathesis catalysts discussed above. The cyclic olefins may be strained or unstrained and may be monocyclic, bicyclic, or multicyclic olefins. If the cyclic olefin is functionalized, it may contain one or more functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxo, anhydride, carbamate, and halogen.

Suitable cyclic olefin monomers include monomers disclosed in U.S. Pat. No. 4,943,621 to Janda, et al., U.S. Pat. No. 4,324,717 to Layer, and U.S. Pat. No. 4,301,306 to Layer, all of which are herein incorporated by reference.

Suitable cyclic olefin monomers include norbornene-type monomers which are characterized by the presence of at least one norbornene group which can be substituted or unsubstituted. Suitable norbornene type monomers include substituted norbornenes and unsubstituted norbornene, dicyclopentadiene, dimethyldicyclopentadiene, dihydrodicyclopentadiene, cyclopentadiene trimers, tetramers of cyclopentadiene, tetracyclododecene, and substituted tetracyclododecenes. Common norbornene-type monomers can be represented by the following formulas:

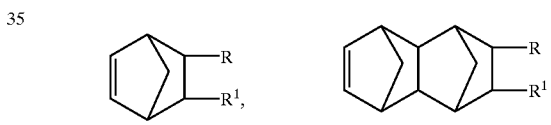

wherein R and $R^1$ may be the same or different and may be hydrogen or a substitute group which may be a halogen, $C_1$–$C_{12}$ alkyl groups, $C_2$–$C_{12}$ alkylene groups, $C_6$–$C_{12}$ cycloalkyl groups, $C_6$–$C_{12}$ cycloalkylene groups, and $C_6$–$C_{12}$ aryl groups or R and $R^1$ together form saturated or unsaturated cyclic groups of from 4 to 12 carbon atoms with the two ring carbon atoms connected thereto, said ring carbon atoms forming part of and contributing to the 4 to 12 carbon atoms in the cyclic group.

Less common norbornene type monomers of the following formulas are also suitable:

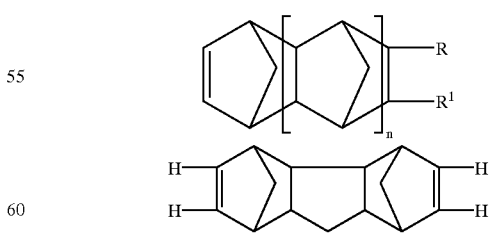

wherein R and $R^1$ have the same meaning as indicated above and n is greater than 1. For example, cyclopentadiene tetramers (n=2), cyclopentadiene pentamers (n=3) and hexacyclopentadecene (n=2) are suitable monomers for use in this invention.

Other specific examples of monomers suitable for use in this invention include:

ethylidenenorbornene,
methyltetracyclododecene,
methylnorbornene,
ethylnorbornene,
dimethylnorbornene and similar derivatives,
norbornadiene,
cyclopentene,
cycloheptene,
cyclooctene,
7-oxanorbornene,
7-oxanorbornene derivatives,
7-oxabicyclo[2.2.1]hept-5ene derivatives,
7-oxanorbornadiene,
cyclododecene,
2-norbornene, also named bicyclo[2.2.1]-2-heptene and substituted bicyclic norbornenes,
5-methyl-2-norbornene,
5,6-dimethyl-2-norbornene,
5-ethyl-2-norbornene,
5-butyl-2-norbornene,
5-hexyl-2-norbornene,
5-octyl-2-norbornene,
5-dodecyl-2-norbornene,
5-isobutyl-2-norbornene,
5-octadecyl-2-norbornene,
5-isopropyl-2-norbornene,
5-phenyl-2-norbornene,
5-p-toluyl-2-norbornene,
5-a-naphthyl-2-norbornene,
5-cyclohexyl-2-norbornene,
5,5-dimethyl-2-norbornene,
dicyclopentadiene (or cyclopentadiene dimer),
dihydrodicyclopentadiene (or cyclopentene cyclopentadiene codimer),
methyl-cyclopentadiene dimer,
ethyl-cyclopentadiene dimer,
tetracyclododecene, also named 1,2,3,4,4a,5,8,8a-octahydro-1,4:5,8-dimethyanonaphthalene
9-methyl-tetracyclo[6.2.1.1$^{3,6}$.0$^{2,7}$]-4-dodecene, also named 1,2,3,4,4a,5,8,8a-octahydro-2-methyl-4,4:5,8-dimethanonaphthalene
9-ethyl-tetracyclo[6.2.1.1$^{3,6}$.0$^{2,7}$]-4-dodecene,
9-propyl-tetracyclo[6.2.1.1$^{3,6}$.0$^{2,7}$]-4-dodecene,
9-hexyl-tetracyclo[6.2.1.1$^{3,6}$.0$^{2,7}$]-4-dodecene,
9-decyl-tetracyclo[6.2.1.1$^{3,6}$.0$^{2,7}$]-4-dodecene,
9,10-dimethyl-tetracyclo[6.2.1.1$^{3,6}$.0$^{2,7}$]-4-dodecene,
9-ethyl, 10-methyl-tetracyclo[6.2.1.1$^{3,6}$.0$^{2,7}$]-4-dodecene,
9-cyclohexyl-tetracyclo[6.2.1.1$^{3,6}$.0$^{2,7}$]-4-dodecene,
9-chloro-tetracyclo[6.2.1.1$^{3,6}$.0$^{2,7}$]-4-dodecene,
9-bromo-tetracyclo[6.2.1.1$^{3,6}$.0$^{2,7}$]-4-dodecene,
cyclopentadiene-trimer,
methyl-cyclopentadiene-trimer, and the like.

In a preferred embodiment, the cyclic olefin is cyclobutene, dimethyl dicyclopentadiene, cyclopentene, cycloheptene, cyclooctene, cyclononene, cyclodecene, cyclooctadiene, cyclononadiene, cyclododecene, norbornene, norbornadiehe, 7-oxanorbornene, 7-oxanorbornadiene, and dicyclopentadiene; each of which may be functionalized or unfunctionalized. In a more preferred embodiment, the cyclic olefin is dicyclopentadiene. Suitable dicyclopentadiene is commercially available, for example, from Lyondell under the trademarks Lyondell 108 and Lyondell 103.

This invention contemplates preparation of homopolymers, as well as random and block copolymers and terpolymers of the suitable monomers discussed above.

Reinforcement Materials

The pipes and pipe fittings may be reinforced or unreinforced. Suitable reinforcing materials include those that add to the strength or stiffness of the pipe and pipe fittings when incorporated with the polymer. Reinforcing material can be in the form of filaments, fibers, rovings, mats, weaves, fabrics, or other known structures. Preferably, the reinforcing material is in filament or fiber form or fibers that are knitted into a fabric.

Representative suitable reinforcement materials include barium sulfate; minerals, such as glass, carbon, graphite, ceramic, boron, and the like; metallic materials; organic polymers, such as aromatic polyamides including the aramid fibers, such as Kevlar®, and polybenzimide, polybenzoxazol, polybenzothiazol, polyesters, and the like; polyolefins; fluoropolymer, such as Halar®; cellulosic materials; and other material known to be useful as reinforcing material for polymer systems. Examples of other commercially available reinforcing materials include the following products: Fiberfrax® from Unifrax Corporation, Interfil® from Akzo Nobel, and wollastonite from Nyco. Fiber glass or fiber glass knitted into a fabric are preferred. The reinforcing materials may be "sized", i.e., treated or coated with a coupling agent, often also referred to as a sizing or bonding agent, to render them more compatible for adhering with the olefin polymer matrix. As used herein, "coupling agent" means any material that can be applied to a reinforcing material that improves adhesion/wetout between the reinforcement materials and the polyolefin.

The coupling agents must be capable of being used in the presence of the metathesis polymerization reactions, preferably Ring Opening Metathesis Polymerization (ROMP) reactions, catalyzed with a ruthenium or osmium catalyst, without adversely affecting the catalyst or the polymerization reaction. Suitable sizing agents include conventional sizing agents which do not include functional groups that will poison or adversely effect the metathesis polymerization reaction or catalyst.

Suitable coupling agents include a variety of conventional chromium; silane; titanate; zirconate, zirco-aluminate, and hydroxyl terminated amphaphilic coupling agents. Preferably, those which do not contain the following functionalities: vinyl ethers; active oxygen functionalities such as hydroperoxides or activated epoxides; acetylenes; and other Lewis bases that may poison or adversely affect the ruthenium or osmium catalyst.

Methods of Manufacturing Pipe

Suitable methods for manufacturing the polyolefin resin pipe and pipe fittings include those generally known in the art for producing thermosetting pipe. Suitable methods may include a variety of polymer processing techniques, such as: casting, centrifugal casting, molding, rotational molding, open molding, reaction injection molding (RIM), resin transfer molding (RTM), pouring, surface coating, pultrusion, filament winding and other methods known to be useful for producing polyolefin resin pipe and pipe fittings.

Preferably, the pipe is manufactured through rotational molding, centrifugal casting, RTM, pultrusion, or filament winding methods. These methods are preferred because the controllability of the pot life of the metathesis reactions catalyzed by the ruthenium or osmium catalysts, and the stability of these catalysts in the presence of impurities, provides a distinct advantage over methods using traditional catalysts. Typically, pressures above ambient are not needed to form quality pipe using the methods of the current invention.

Centrifugal casting may be used to prepare reinforced or unreinforced plastic articles. As is known in the art, centrifugal casting generally entails feeding a reaction mixture into a spinning mold and allowing the reaction mixture to polymerize. Centrifugal casting may be performed, for example, as described in U.S. Pat. No. 5,266,370 to Woodson, which is herein incorporated by reference. Filament winding is a preferred method of manufacturing reinforced polyolefin pipe. As is known in the art, filament winding is generally carried out by coating at least a portion of a reinforcing material with the reaction mixture; winding the coated reinforcing material around a mandrel; and allowing the olefin monomer to polymerize while the coated reinforcing material is wound around the mandrel. Alternatively, reinforced polyolefin pipe may be prepared by pultrusion. Pultrusion is a process whereby reinforcements are either pulled through a bath of the reaction mixture into a heated die where the coated reinforcement is formed into a pipe profile and cured as the pipe pases through the die; or, alternatively, the reinforcement may be pulled into the die dry, then the reaction mixture may be injected into the die to form the pipe. Pultrusion may be carried out as a continuous process.

Reaction and Processing Conditions

The parameters for the metathesis polymerization reactions used in the current invention, such as the atmosphere, the ratio of catalyst to olefin, the reaction temperatures, the solvents that may be used, the additives and other agents that may be present during the polymerization reaction, and the methods for carrying out the metathesis polymerization are discussed in the incorporated references identified above.

Generally, the polymerization of the olefin is carried out by adding the desired ruthenium or osmium carbene metathesis catalyst to the monomer starting material which has been heated to a starting resin temperature. Alternatively, the catalyst may be first added to the monomer starting material and the mixture then heated to the required temperature. The starting resin temperature is not critical; but, as is known, this temperature does affect the rate of the polymerization reaction. Generally, the reaction temperature will be in the range of about 0°C. to about 100° C., and preferably about 25° C. to about 450° C.

The ratio of catalyst to starting material is not critical and can within the range from about 1:5 to about 1:200,000 by mole. Ratios of catalyst to starting material of between about 1:2,000 and 1:15,000 by mole are preferred. The invention may be practiced using catalyst/starting material ratios outside of the above ranges.

The monomer starting material may optionally be refluxed, run through absorption purification, and degassed before the catalyst is added; although, none of these procedures is necessary to practice the invention.

If a gel modification additive, cross-linking agent, or other additive is used it is preferred that the additives be added before the catalyst; although, in some embodiments this is not critical.

Although it is preferred that the reaction be conducted in the absence of a solvent this is not critical. Possible solvents that may be used include organic, protic, or aqueous solvents which are inert under the reaction conditions. Examples of suitable solvents may include aromatic hydrocarbons, chlorinated hydrocarbons, ethers, alipahtic hydrocarbons, alcohols, water, or mixtures thereof.

After polymerization is complete (i.e., after the article has "cured") the polyolefin article may be post cured to initiate increased cross-linking. As is known, additional cross-linking may be accomplished by post-curing at an elevated temperature. As is well known in the art, other methods may be used to post-cure the polyolefin material.

Unlike previous catalyst systems, the catalyst/monomer starting material mixture of the present invention may remain liquid for a considerable period of time, even in air, depending on the temperature and the amount of gel modification additive present. This characteristic of the present catalyst system allows polyolefin pipe and pipe fittings to be made using a variety of polymer processing techniques discussed above.

The monomer starting material may optionally include one or more gel modification additives which are added to control the pot life of the reaction mixture.

The monomer starting material may also optionally include one or more cross-linking agents for initiating additional post cure cross-linking of the polyolefin.

The monomer starting material may optionally include additives such as fillers, binders, plasticizers, pigments, dyes, etc., as is known in the art. However, because of the functional group tolerance of the catalysts, additives which can not be used with other catalyst systems in the preparation of pipe and pipe fittings may be used.

The monomer starting material may also include a flame-retarding agent to reduce the flammability of the polyolefin pipe. The flame-retarding agent must be capable of being used in the presence of the metathesis polymerization reactions catalyzed with a ruthenium or osmium catalyst, without adversely affecting the catalyst or the polymerization reaction. Suitable flame-retarding agents include conventional flame-retarding agents which do not include functional groups that will poison or adversely effect the metathesis polymerization reaction or catalyst.

EXAMPLE 1

A two inch diameter reinforced polydicyclopentadiene (PolyDCPD) pipe was produced using a centrifugal casting method. A standard fiberglass fabric was used as the reinforcing material. The fiberglass was sized with a methacrylatochromic chloride complex sizing agent purchased from Du Pont under the trademark "Volan". The following components, including an intumescent flame-retarding agent purchased from Clariant under the trademark Exolit IFR-11, were mixed to make the DCPD resin/catalyst mixture:

| Ingredient | Parts Per Hundred Resin |
| --- | --- |
| DCPD Monomer | 100 |
| Catalyst* | 0.083 |
| Triphenyl phosphine | 0.0938 |
| Exolit IFR-11 or 10 | 11.11 |
| Ciba-Geigy Tinuvin 123 | 0.10 |
| Albemarle Ethanox 702 | 4.0 |
| TOTAL | 115.387 |

*bis-(tricyclohexylphosphine)-benzylidine ruthenium dichloride

The following process steps were then used to produce the pipe:

1. The Volan sized fiberglass fabric was rolled around a tube (mandrel) smaller than the inside diameter of the desired finished pipe. The number of layers and weight of the fabric may vary with the diameter and pressure rating of the finished pipe.

2. The fabric and tube were inserted into the mold tube, and the tube was spun at a high enough revolutions per minute (RPM) to "unwind"the fabric from the mandrel.

3. After the mandrel was withdrawn, plugs were inserted into each end of the mold tube. One of the plugs included a port which could be sealed after injecting the resin/catalyst mixture into the tube through the port.

4. A premeasured amount of the above resin/catalyst mixture formulation was injected into the tube through the port in the end plug. The amount of resin depends upon the desired wall thickness and diameter of the finished pipe.

5. The tube was spun at a speed which will result in approximately 75 G's of force on the outside of the mold tube. A temperature of 85–90° F. was maintained by keeping the temperature of the room in which the pipe was produced at this temperature. This insures that the mold, glass and resin are all the same temperature.

6. The tube was allowed to spin for approximately 30 minutes (the resin exothermed and gelled during this time).

7. The mold tube and pipe were removed from the spinning machine and placed in a post cure oven for 30 minutes at 300° F.

8. The pipe was removed from the mold tube, the ends of the pipe were trimmed, and the mold tube was recycled.

Upon removal of the pipe, no significant odor of DCPD was noticed, indicating no significant amount of residual monomer after curing.

End caps were then adhesively bonded onto each end of the sized pipe so that a hydrostatic pressure test could be performed in accordance with ASTM procedure D1599. The sized pipe was pressurized up to about 1500 pounds per square inch (psi) before failing by actually tearing the fiberglass fabric. There was no weepage up to this point, indicating that the pipe is substantially impermeable, and there was no pathway for leakage along the unreacted monomer.

EXAMPLE 2

A 2-inch diameter reinforced DCPD pipe was prepared as in Example 1. This pipe was tested under various ASTM D test conditions. The results were as follows:

| Property | ASTM D Test | Units | DCPD Pipe |
| --- | --- | --- | --- |
| Impact Resistance | 2444 | ft.-lbs | >120 |
| Ultimate Burst Hoop Strength | 1599 | psi | 65,000 |
| Beam Bending Modulus | 2925 | $10^6$ psi | 1.90 |
| External Collapse Pressure | 2924 | psig | 620 |
| Tensile Strength | 2105 | psi | 12,000 |
| Tensile Modulus | | $10^6$ psi | 1.15 |

The impact resistance test was performed on less samples than customary for ASTM D Test 2444. The DCPD pipe impact resistance data indicates that, on average, the DCPD pipe samples did not fail upon being subjected to test conditions as great as 120 foot-pounds.

We claim:

1. A method of making a polyolefin pipe or pipe fitting, the method comprising the steps of:

a) adding a Ru or Os metathesis catalyst to at least one cyclic olefin monomer comprising dicyclopentadiene to form a reaction mixture consisting essentially of the catalyst and the monomer;

b) forming the reaction mixture into a shape for the article, wherein the article is a pipe or a pipe fitting; and c) allowing the formed reaction mixture to polymerize under polymerization conditions.

2. A method of making a polyolefin pipe or pipe fitting, the method comprising the steps of:

a) adding a Ru or Os metathesis catalyst to dicyclopentadiene to form a reaction mixture;

b) forming the reaction mixture into a shape for the article, wherein the article is a pipe or a pipe fitting; and c) allowing the formed reaction mixture to polymerize under polymerization conditions.

3. A polyolefin article comprising:

a polyolefin prepared by polymerizing dicyclopentadiene in the presence of a metathesis polymerization catalyst which comprises a ruthenium complex catalyst or an osmium complex catalyst, wherein the article is a pipe or a pipe fitting, and wherein the article has an impact resistance greater than about 120 foot-pounds.

* * * * *